Sept. 8, 1964 L. G. BOBROWSKI 3,147,524
FASTENER
Filed Aug. 14, 1961

INVENTOR.
LOUIS G. BOBROWSKI
BY Lindsey Prutzman, and Hayes
ATTORNEYS

United States Patent Office 3,147,524
Patented Sept. 8, 1964

3,147,524
FASTENER
Louis G. Bobrowski, Berlin, Conn., assignor to The Stanley Works, New Britain, Conn., a corporation of Connecticut
Filed Aug. 14, 1961, Ser. No. 131,278
1 Claim. (Cl. 24—73)

The present invention relates to fasteners of the type engageable on a supporting panel or structure for securing moldings, panels, accessory items, and other elements thereto.

It is an object of the present invention to provide a simple and economical sheet metal fastener for securing two members together which is readily fabricated and easily engaged upon a supporting structure by deformation of an element thereof.

It is also an object to provide a clip fastener which is readily manufactured from sheet metal at low cost and adaptable for a wide variety of designs and enabling use with supported elements of relatively small height.

Another object is to provide such a sheet metal fastener which is quickly mounted on supporting structures by use of a simple tool to provide a rigid fastener and which can be readily dismounted by a simple tool.

A further object is to provide such a fastener having means thereon for sealing the aperture in the supporting structure to prevent passage of liquids, dirt and gases therethrough.

Other objects will be in part obvious and in part pointed out more in detail hereinafter.

The invention accordingly consists in the features of construction, combination of elements and arrangement of parts which will be exemplified in the construction hereafter set forth and the scope of the application which will be indicated in the appended claims.

Figure 1:
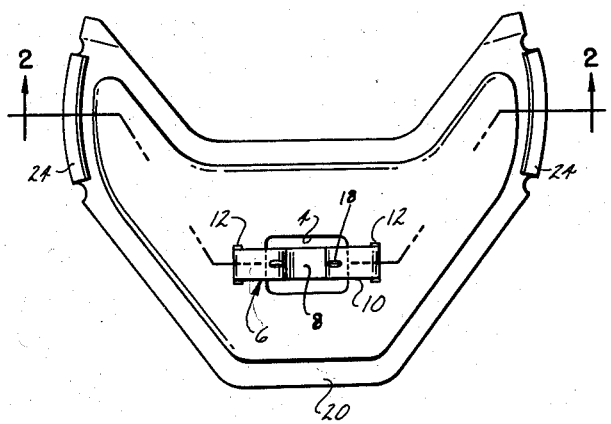
FIG. 1 is a plan view of a sheet metal fastener formed in accordance with the present invention.
Figure 2:
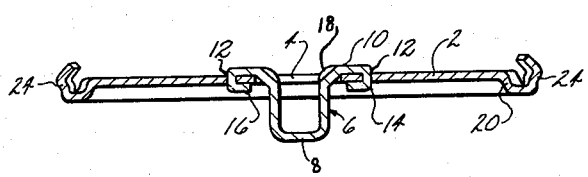
FIG. 2 is a sectional view of the fastener along the line 2—2 of FIG. 1.

Referring to the attached drawing in detail, a sheet metal fastener exemplary of the present invention is formed by a mounting plate or superstructure 2 having an aperture 4 therein in which is seated a fastening strap 6 having a substantially U-shaped center portion 8 which, in seated position, depends from the plate 2. The strap 6 has flanges 10 extending laterally outwardly from the U-shaped center portion 8 along the upper surface of the mounting plate 2 by which the strap is secured thereto.

Although the flanges 10 may be secured to the mounting plate 2 by riveting, brazing, welding and other means, a highly satisfactory and convenient means of assembly has been provided by the illustrated embodiment wherein the mounting plate 2 is provided with a pair of openings 12 spaced from the main aperture 4 and through which end portions 14 on the flanges 10 depend. The free ends 16 of the end portions 14 are then bent or crimped so as to provide legs extending along the bottom surface of the mounting plate 2 toward the U-shaped center portion. In this manner, the reversely bent flanges 10 secure the fastening strap 6 tightly to the mounting plate 2 very quickly and economically.

At the junctures of the flanges 10 to the U-shaped center portion 8, the fastening strap 6 is deformed or corrugated downwardly between its side margins to provide longitudinally extending ribs 18 on the bottom surface which serve to reinforce the junctures of the two portions.

Figure 3:
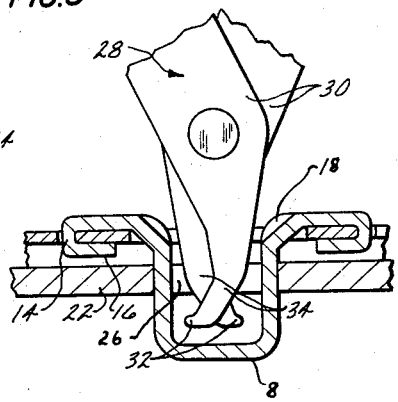
FIG. 3 is an enlarged fragmentary cross-section of the fastener as inserted in an aperture of a supporting structure and illustrating a tool for securing it therein.
Figure 4:
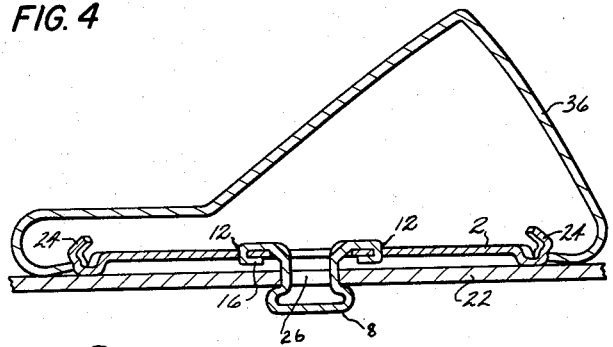
FIG. 4 is a cross-section of the fastener as secured to the supporting structure and having a molding element mounted thereon.

In the illustrated embodiment, the periphery of the mounting plate 2 is deformed downwardly to provide a leg portion 20 for spacing the body of the plate 2 upwardly from the supporting panel 22, as shown in FIGS. 3 and 4, and the leg portion also serves to stiffen the plate by providing a peripherally extending ribbed corrugation. The necessity for such spacing is largely dependent upon the actual contour of the panel and the means employed for securing the fastening strap 6 to the mounting plate 2. At the ends of the mounting plate 2 are upstanding flanges 24 which taper outwardly and then inwardly to provide spring arms which may be snapped into engagement with suitably configured fittings, moldings and other decorative elements.

As best shown in FIGS. 3 and 4, the fastener is mounted by inserting the U-shaped portion 8 into a suitable aperture 26 in the supporting panel 22. The legs of the U-shaped portion 8 are then deformed laterally outwardly to engage the bottom surface of the supporting panel 22, conveniently by use of the tool 28 generally illustrated in FIG. 3. The tool 28 has a pair of pivotally connected blades 30 which have outwardly and oppositely extending projections 32 on their head portions 34 which move outwardly against the legs of the U-shaped portion 8 upon closing movement of the opposite ends of the blades.

In FIG. 4, a completed installation is illustrated with the U-shaped portion 8 having been laterally deformed so as to engage the undersurface of the mounting panel 22 and thus firmly secure the fastener thereto. A molding or other decorative member 36 is shown engaged upon the flanges 24 of the mounting plate 2.

If it is desired to disengage the fastener from the supporting panel, a punch or similar tool can be driven against the base of the U-shaped portion 8 to elongate it and disengage it from the undersurface of the panel.

Figure 5:
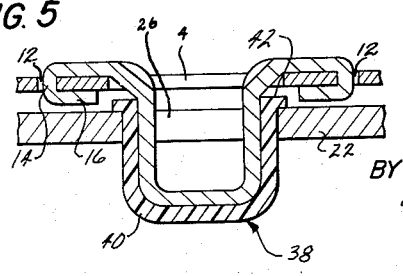
FIG. 5 is a cross-section of an alternative embodiment employing a resilient sealing member.

In the embodiment illustrated in FIG. 5, the fastening strap 6 is provided with a resilient sealing member 38 to prevent passage of liquids, dirt and gases through the aperture formed in the supporting panel 22. The sealing member 38 has a hollow cap portion 40 surrounding the depending U-shaped portion 8 and a peripheral flange portion 42 extending laterally outwardly therefrom along the bottom of the mounting plate and, when assembled to the supporting panel 22, along the upper surface thereof.

The fastener of the present invention is particularly advantageous since the mounting plate may be of any desired configuration and design and permits wide latitude in the placement thereon of the upstanding flanges or other elements for securing the moldings and other fittings. Accordingly, the mounting plate can be designed and economically fabricated to give maximum engagement with the particular molding or fitting since the separately formed fastening strap is subsequently assembled therewith in a simple operation and requires provision only of the necessary apertures for receiving the strap. Thus, a highly versatile and rugged fastener can be simply and economically manufactured from sheet metal.

The fastener has been found highly desirable in that a relatively large variation in the size of the aperture in the supporting panel can be accommodated and also in that the ragged and burred edges about the aperture formed by the drilling operation do not interfere with its engagement to the panel, the deformation of the U-shaped portion tending to deform the burrs outwardly of the aperture.

As is evident from the foregoing description and the drawing, the fastener is simply and quickly secured to the supporting panel and may be readily disengaged therefrom. If so desired, a sealing member may be readily incorporated in the fastener to prevent passage of liquids, dirt and gases through the aperature in the supporting member for receiving the fastener.

As will be apparent to persons skilled in the art, various modifications and adaptations of the structure above described will become readily apparent without departure from the spirit and scope of the invention, the scope of which is defined in the appended claim.

I claim:

A sheet metal fastener for securing moldings and the like to a supporting panel comprising a plate member with upstanding means thereon for engaging the moldings and the like, said plate member having an aperture and a pair of openings spaced on opposite sides of said aperture; and a separate strap member made of a deformable strip metal and having a generally U-shaped portion seated in said aperture and depending from said plate member, said strap member having flanges extending laterally of said U-shaped portion and through spaced openings of the plate member, with the ends thereof reversely bent to extend along the opposite surface of the plate member, said U-shaped portion providing a developable surface and being constructed and arranged for insertion in an aperture of the supporting panel, the legs of said U-shaped portion being spaced apart to provide a cavity for receiving a spreading tool to elongate the closed end and to shorten the legs of the U-shaped portion at the rear of the supporting panel by engaging the legs to apply a force in a direction parallel to the plane of the supporting panels.

References Cited in the file of this patent

UNITED STATES PATENTS

| | | |
|---|---|---|
| 2,306,460 | Meyer et al. | Dec. 29, 1942 |
| 2,655,072 | Poupitch | Oct. 13, 1953 |
| 2,784,471 | Bedford | Mar. 12, 1957 |
| 2,889,600 | Brown | June 9, 1959 |
| 2,995,789 | Holten | Aug. 15, 1961 |